United States Patent
Nakai

(10) Patent No.: US 12,355,883 B2
(45) Date of Patent: Jul. 8, 2025

(54) INFORMATION PROCESSING DEVICE, INFORMATION PROCESSING METHOD, AND COMPUTER READABLE MEDIUM

(71) Applicant: Mitsubishi Electric Corporation, Tokyo (JP)

(72) Inventor: Tsunato Nakai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 18/138,972

(22) Filed: Apr. 25, 2023

(65) Prior Publication Data

US 2023/0261868 A1 Aug. 17, 2023

Related U.S. Application Data

(63) Continuation of application No. PCT/JP2020/047098, filed on Dec. 17, 2020.

(51) Int. Cl.
H04L 29/06 (2006.01)
G06F 21/64 (2013.01)
H04L 9/32 (2006.01)

(52) U.S. Cl.
CPC ............ *H04L 9/321* (2013.01); *G06F 21/64* (2013.01)

(58) Field of Classification Search
None
See application file for complete search history.

(56) References Cited

U.S. PATENT DOCUMENTS

| 2019/0065974 A1 | 2/2019 | Michigami |
| 2019/0130265 A1 | 5/2019 | Ling et al. |
| 2020/0034545 A1 | 1/2020 | Takao |

FOREIGN PATENT DOCUMENTS

| JP | 2018-173711 A | 11/2018 |
| JP | 2019-46460 A | 3/2019 |
| JP | 2019-82996 A | 5/2019 |
| JP | 2019-101807 A | 6/2019 |
| JP | 2019109680 A * | 7/2019 |

(Continued)

OTHER PUBLICATIONS

Vannostrand, Peter M. et al. Confidential Deep Learning: Executing Proprietary Models on Untrusted Devices. arXiv.org., Aug. 28, 2019, arXiv:1908.10730v1, pp. 1-6 (Year: 2019).*

(Continued)

*Primary Examiner* — Andrew J Steinle
(74) *Attorney, Agent, or Firm* — BIRCH, STEWART, KOLASCH & BIRCH, LLP

(57) ABSTRACT

A rich execution unit (110) executes an application (111) while executing a rich OS. A secure execution unit (120) executes a target operation, which is an operation based on a learning model, while executing a secure OS. A decryption processing unit (122) decrypts model information from encrypted model information of the learning model when execution of the target operation is requested by the application. An operation execution unit (121) executes the target operation using the model information. A falsification detection unit (123) determines whether the encrypted model information is falsified information. An output control unit (124) passes an execution result of the target operation to the application when it is determined that the encrypted model information is not the falsified information.

6 Claims, 9 Drawing Sheets

(56) References Cited

FOREIGN PATENT DOCUMENTS

| JP | 2019121141 A | * | 7/2019 |
| JP | 2020-52813 A | | 4/2020 |
| JP | 2020-52814 A | | 4/2020 |

OTHER PUBLICATIONS

International Search Report (PCT/ISA/210) issued in PCT/JP2020/047098, dated Mar. 23, 2021.
Office Action issued in Japanese Patent Application No. 2021-522565, dated Sep. 14, 2021.
Vannostrand et al., "Confidential Deep Learning: Executing Proprietary Models on Untrusted Devices", arXiv:1908.10730v1, Aug. 28, 2019, pp. 1-6.

* cited by examiner

1

INFORMATION PROCESSING DEVICE, INFORMATION PROCESSING METHOD, AND COMPUTER READABLE MEDIUM

CROSS REFERENCE TO RELATED APPLICATIONS

This application is a Continuation of PCT International Application No. PCT/JP2020/047098, filed on Dec. 17, 2020, which is hereby expressly incorporated by reference into the present application.

TECHNICAL FIELD

The present disclosure relates to maintaining confidentiality and falsification detection for model information of learning models.

BACKGROUND ART

For learning models obtained by machine learning, it is desired to maintain the confidentiality of model information such as architectures and parameters. It is also desired that falsification is detected if the model information is falsified.

Non-Patent Literature 1 discloses a method to realize maintaining the confidentiality of learning model information. In this method, an execution environment is virtually separated, and encrypted learning model information is decrypted and machine learning operations are executed only in a secure execution environment (secure OS, trusted OS).

CITATION LIST

Non-Patent Literature

Non-Patent Literature 1: Peter M. VanNostrand, et al., "Confidential Deep earning: Executing Proprietary Models on Untrusted Devices" arXiv, issued on 28 Aug. 2019

SUMMARY OF INVENTION

Technical Problem

In the method of Non-Patent Literature 1, only maintaining the confidentiality of learning model information is realized and falsification detection is not realized.

An object of the present disclosure is to realize maintaining the confidentiality of model information of a learning model and falsification detection for learning model information.

Solution to Problem

An information processing device of the present disclosure includes
a rich execution unit to execute an application while executing a rich operating system; and
a secure execution unit to execute a target operation while executing a secure operating system, the target operation being an operation based on a learning model.
The secure execution unit includes
a decryption processing unit to decrypt model information from encrypted model information of the learning model when execution of the target operation is requested by the application;
an operation execution unit to execute the target operation using the model information;
a falsification detection unit to determine whether the encrypted model information is falsified information; and
an output control unit to pass an execution result of the target operation to the application when it is determined that the encrypted model information is not the falsified information.

Advantageous Effects of Invention

According to the present disclosure, maintaining the confidentiality of model information of a learning model and falsification detection for learning model information can be realized.

DESCRIPTION OF EMBODIMENTS

In the embodiments and drawings, the same elements or corresponding elements are denoted by the same reference sign. Description of an element denoted by the same reference sign as that of an element that has been described will be suitably omitted or simplified. Arrows in diagrams mainly indicate flows of data or flows of processing.

Embodiment 1

Figure 1:
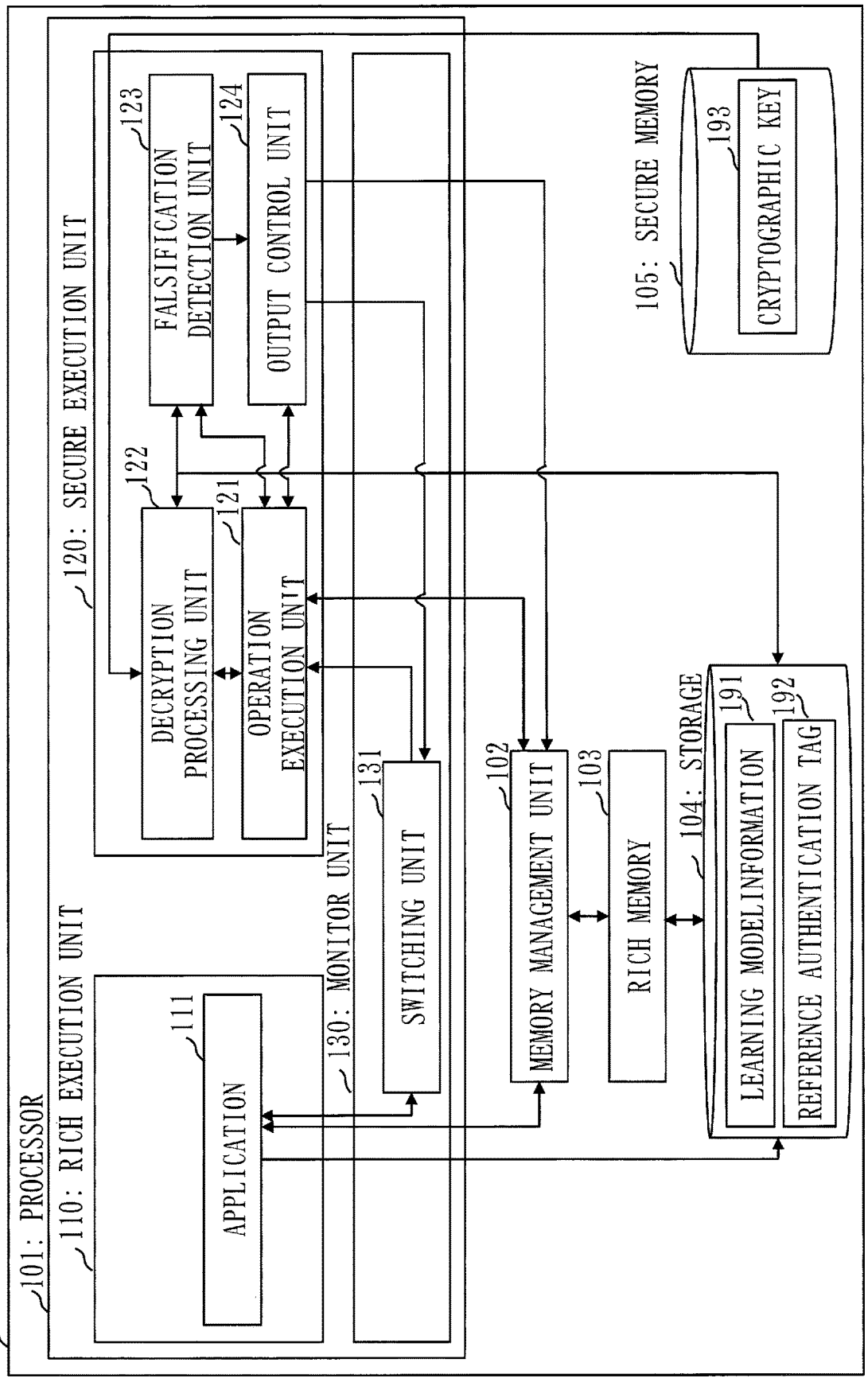
FIG. 1 is a configuration diagram of an information processing device 100 in Embodiment 1.
Figure 2:
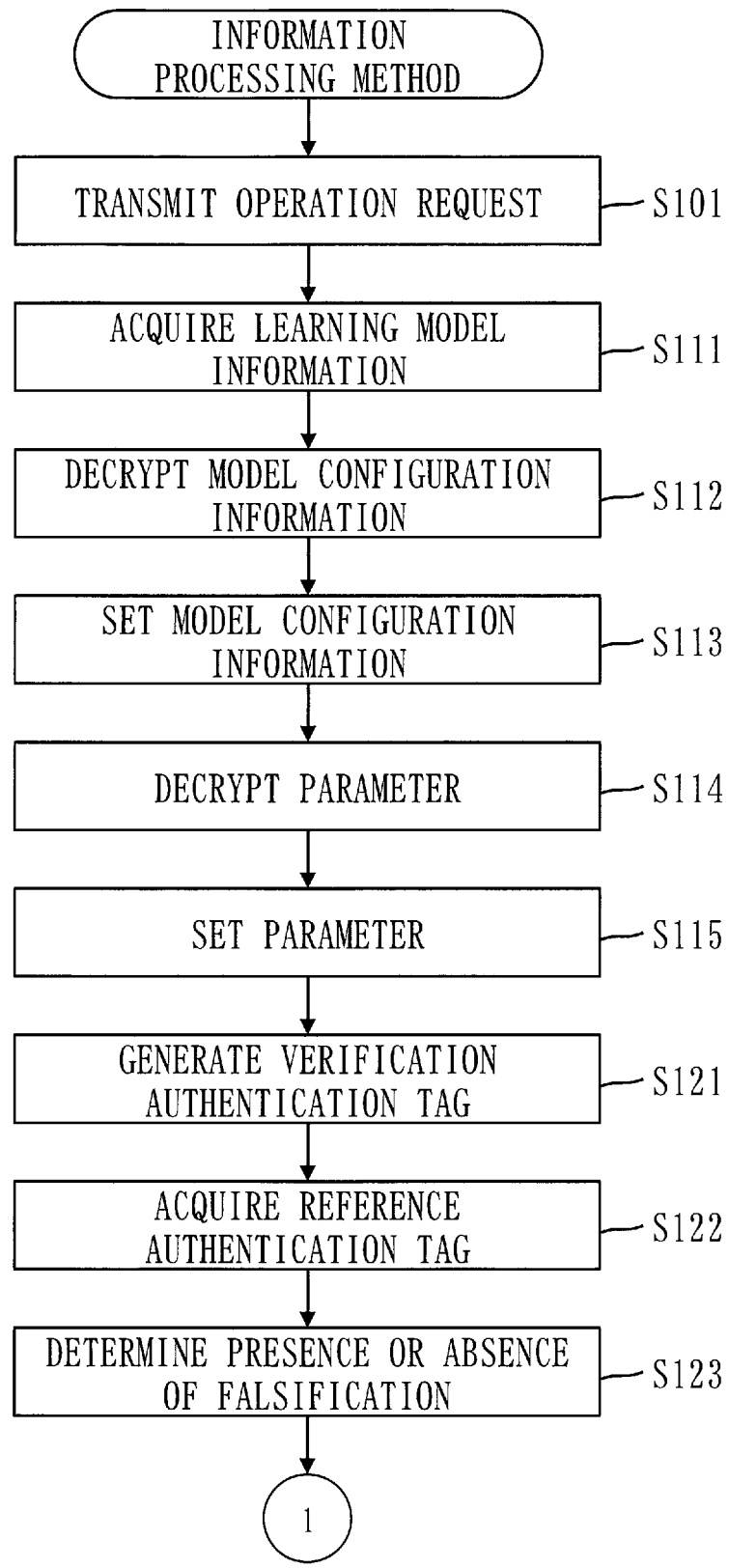
FIG. 2 is a flowchart of an information processing method in Embodiment 1.
Figure 3:
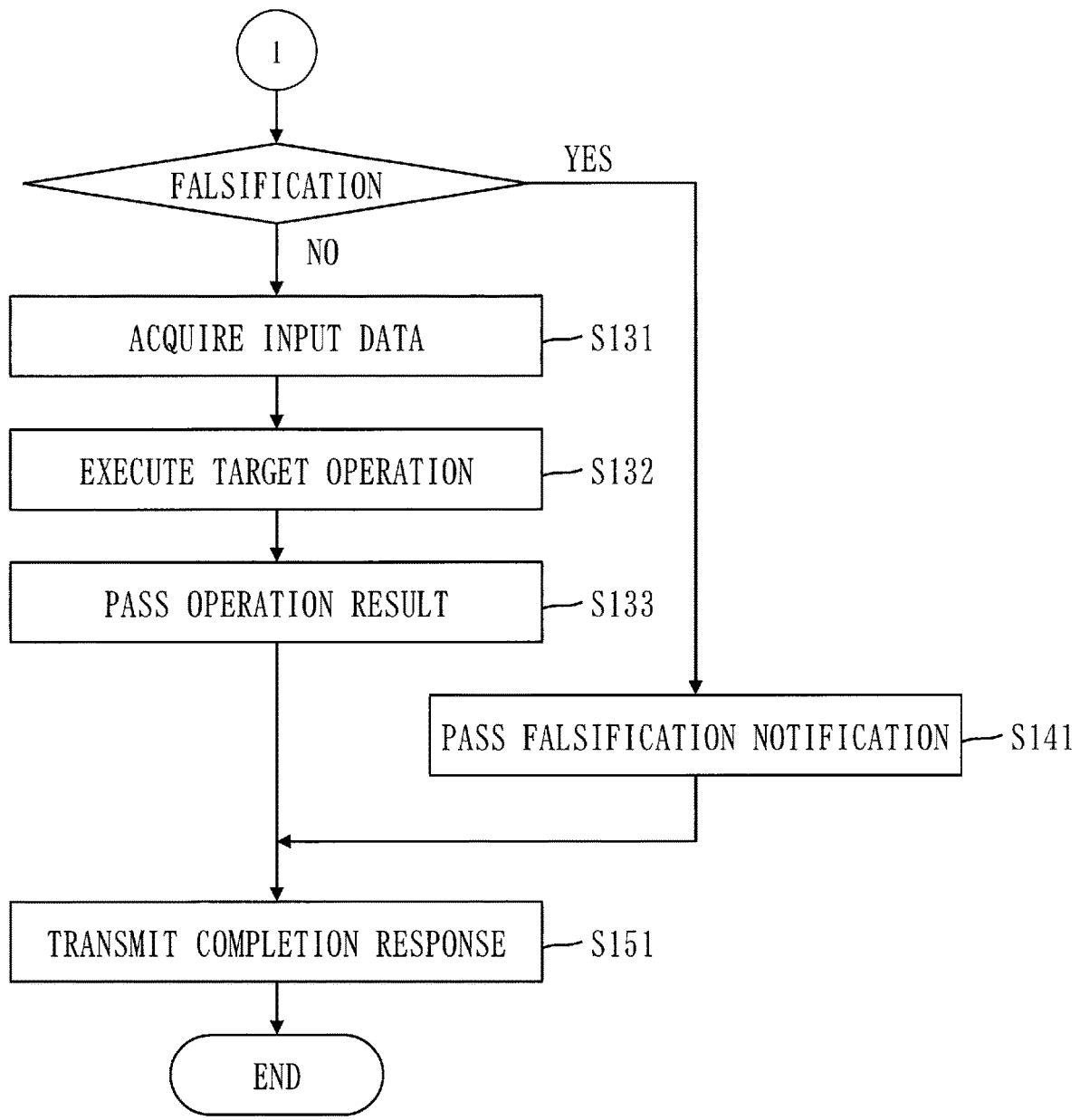
FIG. 3 is a flowchart of the information processing method in Embodiment 1.

An information processing device 100 will be described based on FIGS. 1 to 3.
Description of Configuration
Based on FIG. 1, a configuration of the information processing device 100 will be described.
The information processing device 100 is a computer that includes hardware such as a processor 101, a memory management unit 102, a rich memory 103, a storage 104, and a secure memory 105. These hardware components are connected with one another through signal lines.
The processor 101 is an IC that performs operational processing, and controls other hardware components. For example, the processor 101 is a CPU, a DSP, or a GPU.
IC is an abbreviation for integrated circuit.
CPU is an abbreviation for central processing unit.
DSP is an abbreviation for digital signal processor.
GPU is an abbreviation for graphics processing unit.

The memory management unit 102 controls access to the rich memory 103.

The rich memory 103 is a general-purpose memory and is also called a main storage device or a main memory.

The memory is a volatile or non-volatile storage device. For example, the memory is a RAM. Data stored in the memory is saved in the storage 104 as necessary.

RAM is an abbreviation for random access memory.

The storage 104 is a non-volatile storage device and is also called an auxiliary storage device.

For example, the storage 104 is a ROM, an HDD, or a flash memory. Data stored in the storage 104 is loaded into the rich memory 103 as necessary.

ROM is an abbreviation for read only memory.

HDD is an abbreviation for hard disk drive.

For example, the storage 104 stores learning model information 191, a reference authentication tag 192, and so on.

The secure memory 105 is a memory with security functions and enhanced security.

For example, the secure memory 105 stores a cryptographic key 193 and so on.

The information processing device 100 includes elements such as a rich execution unit 110, a secure execution unit 120, and a monitor unit 130. These elements are realized by software.

The storage 104 stores an information processing program to cause a computer to function as the rich execution unit 110, the secure execution unit 120, and the monitor unit 130. The information processing program is loaded into the rich memory 103 and executed by the processor 101.

The storage 104 further stores an OS. At least part of the OS is loaded into the rich memory 103 and executed by the processor 101.

The processor 101 executes the information processing program while executing the OS.

OS is an abbreviation for operating system.

The information processing device 100 may include a plurality of processors as an alternative to the processor 101.

The information processing program can be recorded (stored) in a computer readable format in a non-volatile recording medium such as an optical disc or a flash memory.

The rich execution unit 110, the secure execution unit 120, and the monitor unit 130 will be described.

The rich execution unit 110 executes an application 111 while executing a rich OS.

The rich OS is a general-purpose OS.

The application 111 is an application program.

The secure execution unit 120 executes a target operation while executing a secure OS.

The secure OS is an OS with security functions and enhanced security.

The target operation is an operation based on a learning model. Specifically, the target operation is an operation to update the learning model by machine learning or an operation to analyze input data using the learning model. A specific example of machine learning is deep learning. However, machine learning is not limited to deep learning, and may be the regression method, decision tree learning, the Bayesian inference method, clustering, or the like.

The secure execution unit 120 includes elements such as an operation execution unit 121, a decryption processing unit 122, a falsification detection unit 123, and an output control unit 124. These elements will be described later.

The monitor unit 130 functions as a virtual monitor and includes a switching unit 131.

The switching unit 131 switches an execution environment of the information processing device 100 to an environment by the rich OS or an environment by the secure OS.

However, the switching of the execution environment may be realized by other methods. For example, the information processing device 100 may be without the monitor unit 130, and the memory management unit 102 may include the switching unit 131.

The elements of the secure execution unit 120 will be described.

When execution of the target operation is requested by the application 111, the decryption processing unit 122 decrypts model information from the learning model information 191. The learning model information 191 includes encrypted model information. The encrypted model information is model information of the learning model that has been encrypted.

The operation execution unit 121 executes the target operation using the model information.

The falsification detection unit 123 determines whether the encrypted model information is falsified information. Falsified information means information that has been falsified.

If it is determined that the encrypted model information is not falsified information, the output control unit 124 passes an execution result of the target operation to the application 111.

If it is determined that the encrypted model information is not falsified information, the operation execution unit 121 executes the target operation using the model information.

If it is determined that the encrypted model information is falsified information, the output control unit 124 passes a falsification notification to the application 111. The falsification notification is a notification to notify falsification of the encrypted model information and is also called a falsification detection alert.

Description of Operation

A procedure for operation of the information processing device 100 is equivalent to an information processing method. The procedure for operation of the information processing device 100 is also equivalent to a procedure for processing by the information processing program.

Based on FIGS. 2 and 3, the information processing method will be described.

In step S101, the rich execution unit 110 starts execution of the application 111.

Then, the rich execution unit 110 transmits an operation request from the application 111 to the switching unit 131. The operation request is a request for execution of the target operation.

The switching unit 131 transmits the operation request to the operation execution unit 121.

In step S111, the operation execution unit 121 uses the memory management unit 102 to acquire the learning model information 191. The memory management unit 102 reads the learning model information 191 from the storage 104 into a memory region for the operation execution unit 121 in the rich memory 103.

The learning model information 191 includes reference information and encrypted model information.

The encrypted model information is model information of the learning model that has been encrypted.

The model information includes model configuration information and a parameter. The model configuration information indicates the configuration of the learning model.

The reference information indicates reference destinations respectively for the encrypted model configuration information and the encrypted parameter. The reference destinations indicate locations in the learning model information 191.

In step S112, the operation execution unit 121 refers to the reference information in the learning model information 191, and notifies the decryption processing unit 122 of the reference destination for the encrypted model configuration information.

The decryption processing unit 122 uses the memory management unit 102 to acquire the encrypted model configuration information at the notified reference destination. The memory management unit 102 reads the encrypted model configuration information from the storage 104 into a memory region for the decryption processing unit 122 in the rich memory 103.

Then, the decryption processing unit 122 decrypts the model configuration information from the encrypted model configuration information, using the cryptographic key 193 stored in the secure memory 105.

In step S113, the operation execution unit 121 acquires the model configuration information from the decryption processing unit 122, and sets the model configuration information in the target operation.

In step S114, the operation execution unit 121 refers to the reference information in the learning model information 191, and notifies the decryption processing unit 122 of the reference destination for the encrypted parameter.

The decryption processing unit 122 uses the memory management unit 102 to acquire the encrypted parameter at the notified reference destination. The memory management unit 102 reads the encrypted parameter from the storage 104 into the memory region for the decryption processing unit 122 in the rich memory 103.

Then, the decryption processing unit 122 decrypts the parameter from the encrypted parameter, using the cryptographic key 193 stored in the secure memory 105.

In step S115, the operation execution unit 121 acquires the parameter from the decryption processing unit 122, and sets the parameter in the target operation.

In step S121, the operation execution unit 121 passes the learning model information 191 to the falsification detection unit 123.

The falsification detection unit 123 generates an authentication tag of the learning model information 191. The authentication tag is calculated by a specific computation. The authentication tag is also called a message authentication code.

The authentication tag that is generated will be referred to as a "verification authentication tag".

In step S122, the falsification detection unit 123 uses the memory management unit 102 to acquire the reference authentication tag 192. The memory management unit 102 reads the reference authentication tag 192 from the storage 104 into a memory region for the falsification detection unit 123 in the rich memory 103.

The reference authentication tag 192 is the original authentication tag of the learning model information 191, that is, the authentication tag of the learning model information 191 that has not been falsified.

In step S123, the falsification detection unit 123 checks the verification authentication tag against the reference authentication tag 192.

Then, the falsification detection unit 123 determines whether the encrypted model information is falsified information based on the result of checking.

If the verification authentication tag matches the reference authentication tag 192, the falsification detection unit 123 determines that the encrypted model information is not falsified information. Then, processing proceeds to step S131.

If the verification authentication tag does not match the reference authentication tag 192, the falsification detection unit 123 determines that the encrypted model information is falsified information. Then, processing proceeds to step S141.

In step S131, the falsification detection unit 123 notifies the output control unit 124 of a determination result indicating that the encrypted model information is not falsified information.

The output control unit 124 notifies the operation execution unit 121 of an execution instruction.

The operation execution unit 121 uses the memory management unit 102 to acquire input data from the application 111. The memory management unit 102 reads the input data from a memory region for the application 111 in the rich memory 103 into the memory region for the operation execution unit 121 in the rich memory 103.

In step S132, the operation execution unit 121 executes the target operation on the input data.

In step S133, the operation execution unit 121 passes an operation result to the output control unit 124. The operation result is an execution result of the target operation, that is, a result obtained by executing the target operation.

The output control unit 124 uses the memory management unit 102 to pass the operation result to the application 111. The memory management unit 102 writes the operation result in the memory region for the application 111 in the rich memory 103.

After step S133, processing proceeds to step S151.

In step S141, the falsification detection unit 123 notifies the output control unit 124 of a determination result indicating that the encrypted model information is falsified information.

The output control unit 124 uses the memory management unit 102 to pass the falsification notification to the application 111. The memory management unit 102 writes the falsification notification in the memory region for the application 111 in the rich memory 103.

After step S141, processing proceeds to step S151.

In step S151, the output control unit 124 transmits a completion response to the switching unit 131. The completion response is a response to the operation request.

The switching unit 131 transmits the completion response to the rich execution unit 110.

The rich execution unit 110 causes the application 111 to execute processing of the case where the operation result is obtained or processing of the case where the falsification notification is obtained.

Effects of Embodiment 1

In a machine learning operation in a secure execution environment, the information processing device 100 decrypts encrypted model configuration information and an encrypted parameter. The information processing device 100 also performs falsification detection. Then, based on the presence or absence of falsification, the information processing device 100 selects whether to execute the operation to output a result, or to output a falsification notification.

As a result, maintaining the confidentiality of model information and falsification detection for the model information can both be achieved in a secure execution environment.

Embodiment 2

With regard to an embodiment in which the overhead of memory resources and calculation time are reduced, differences from Embodiment 1 will be mainly described based on FIGS. 4 to 8.

Description of Configuration

Figure 4:
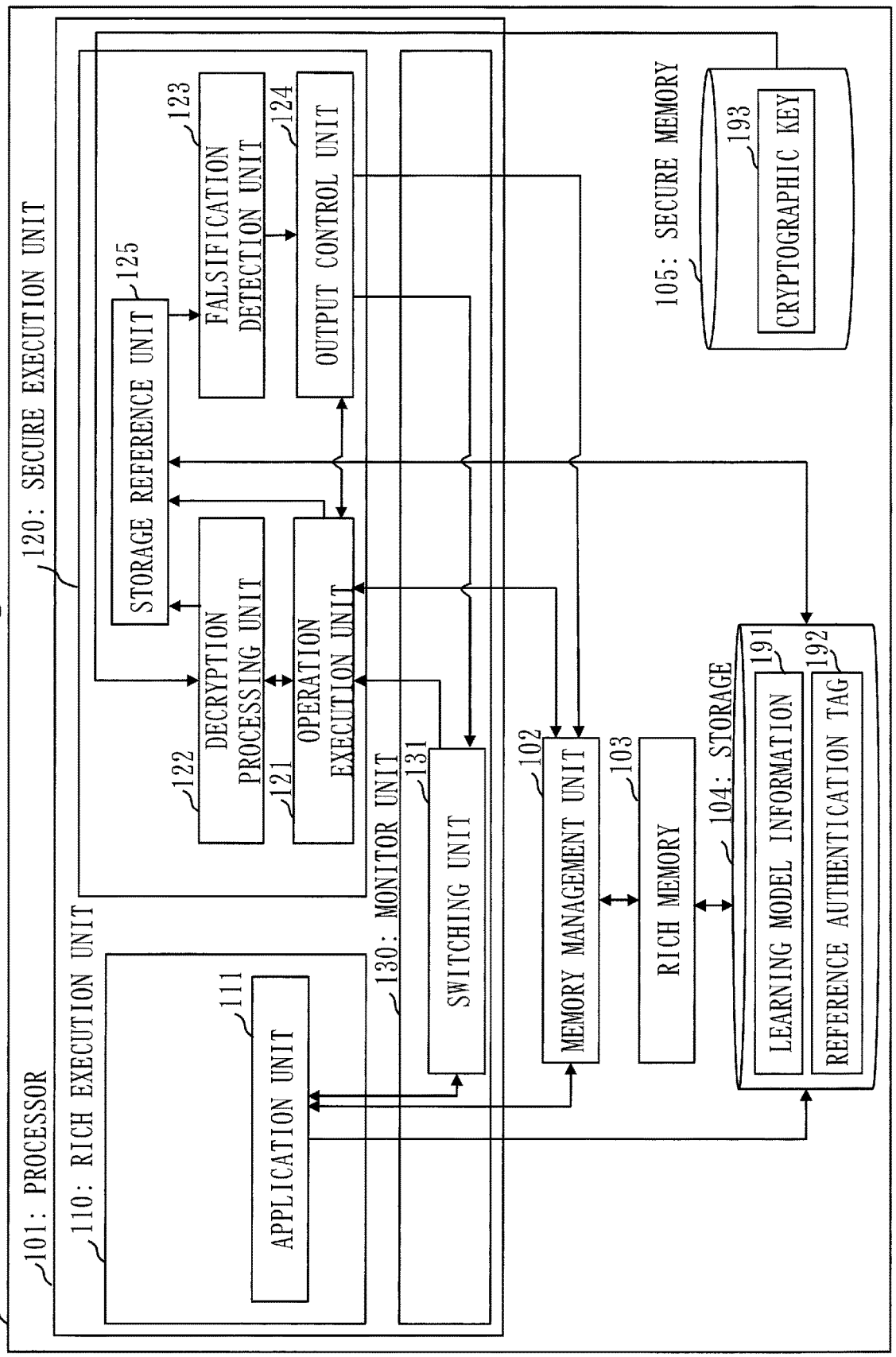
FIG. 4 is a configuration diagram of the information processing device 100 in Embodiment 2.

Based on FIG. 4, a configuration of the information processing device 100 will be described.

The information processing device 100 further includes a storage reference unit 125. The storage reference unit 125 is realized by software.

The information processing program further causes a computer to function as the storage reference unit 125.

The elements of the secure execution unit 120 will be described.

The falsification detection unit 123 executes a calculation process for determining whether encrypted model information is falsified information in parallel with the target operation or concurrently with the target operation.

The falsification detection unit 123 executes the calculation process as described below.

The target operation includes operations for operation functions whose execution order is predetermined.

The encrypted model information includes an encrypted parameter of each of the operation functions.

The decryption processing unit 122 decrypts a parameter of each of the operation functions from the encrypted parameter of each of the operation functions.

The operation execution unit 121 calculates, according to the execution sequence, each of the operation functions using the parameter of each of the operation functions.

The falsification detection unit 123 executes, according to the execution order, the calculation process using the encrypted parameter of each of the operation functions in parallel with the operation of each of the operation functions or concurrently with the operation of each of the operation functions.

Specifically, the falsification detection unit 123 executes the calculation process as described below.

The encrypted model information includes encrypted model configuration information.

First, the falsification detection unit 123 generates an authentication tag of the encrypted model configuration information as a provisional authentication tag.

Next, the falsification detection unit 123 executes, according to the execution order, the calculation process using the encrypted parameter of each of the operation functions so as to update the provisional authentication tag.

Next, the falsification detection unit 123 generates a verification authentication tag using the updated provisional authentication tag.

Then, the falsification detection unit 123 checks the verification authentication tag against the reference authentication tag 192 to determine whether the encrypted model information is falsified information.

If it is determined that the encrypted model information is falsified information, the output control unit 124 passes a falsification notification to the application 111.

Description of Operation

Figure 5:
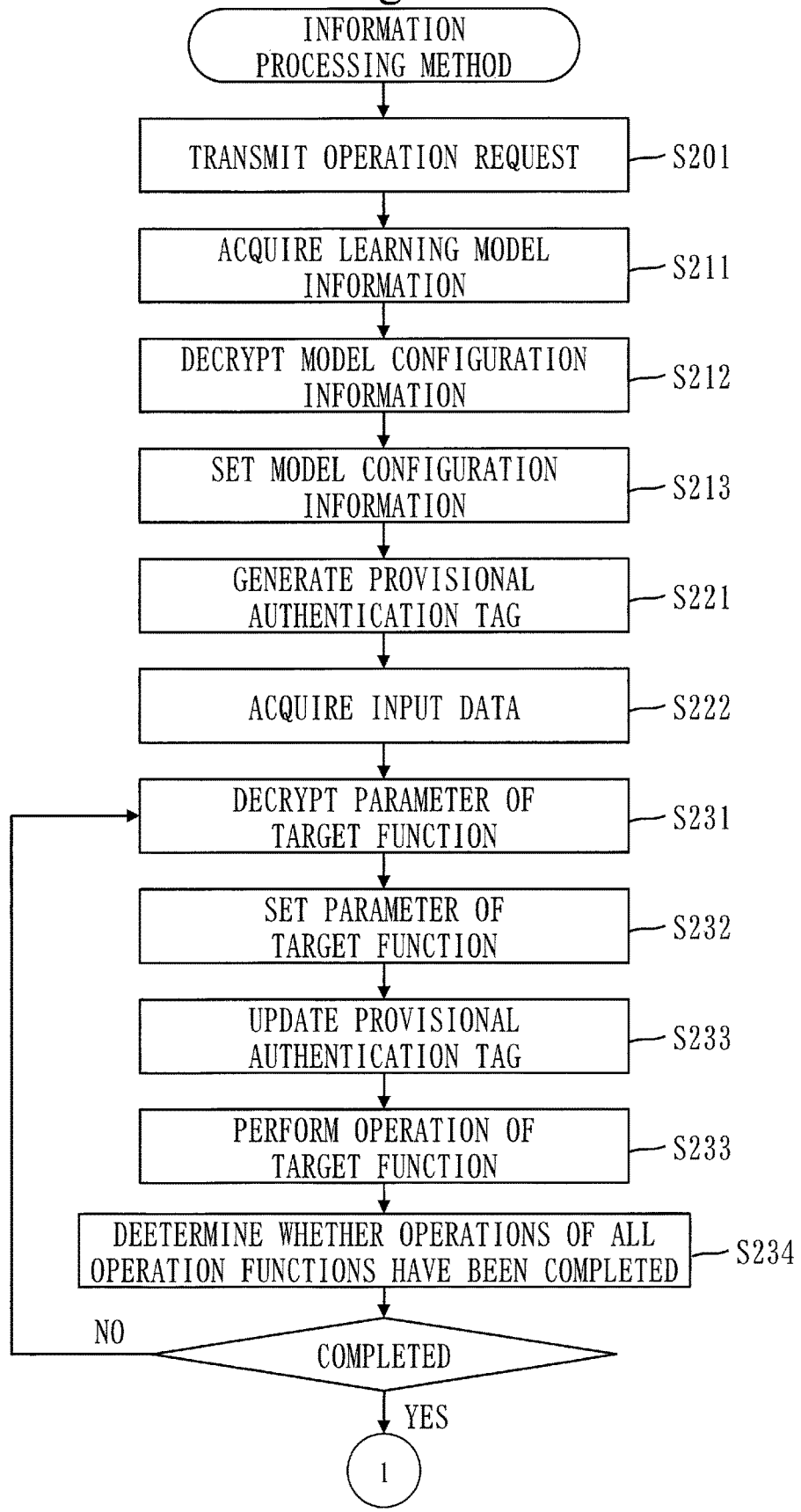
FIG. 5 is a flowchart of the information processing method in Embodiment 2.
Figure 6:
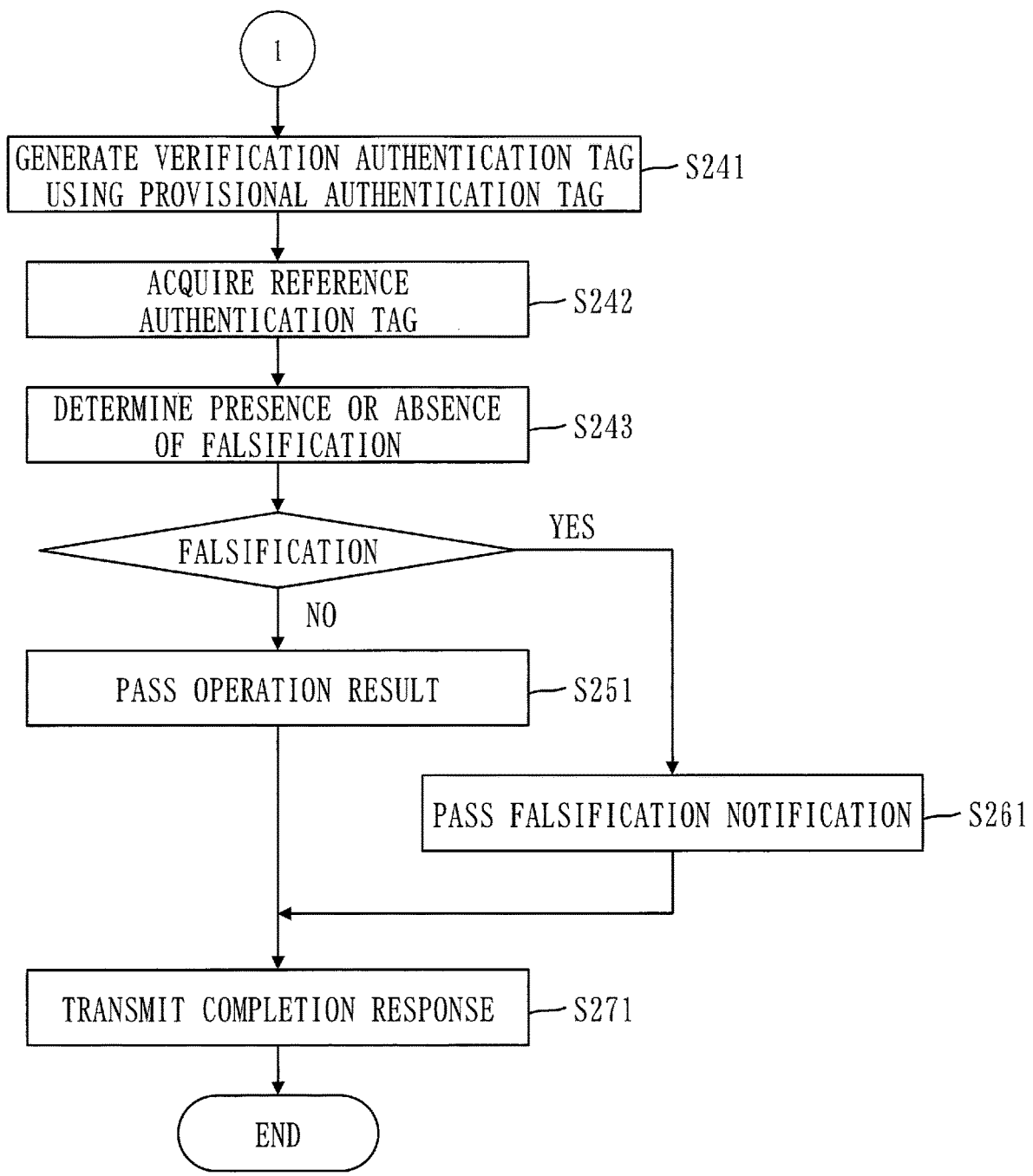
FIG. 6 is a flowchart of the information processing method in Embodiment 2.

Based on FIGS. 5 and 6, the information processing method will be described.

In step S201, the rich execution unit 110 transmits an operation request from the application 111 to the switching unit 131.

Step S201 is the same as step S101 in Embodiment 1.

In step S211, the operation execution unit 121 uses the memory management unit 102 to acquire the learning model information 191.

Step S211 is the same as step S111 in Embodiment 1.

In step S212, the operation execution unit 121 passes the learning model information 191 to the storage reference unit 125.

The storage reference unit 125 acquires encrypted model configuration information from the learning model information 191, and passes the encrypted model configuration information to the decryption processing unit 122.

The decryption processing unit 122 decrypts model configuration information from the encrypted model configuration information, using the cryptographic key 193 stored in the secure memory 105.

In step S213, the operation execution unit 121 acquires the model configuration information from the decryption processing unit 122, and sets the model configuration information in the target operation.

Step S213 is the same as step S113 in Embodiment 1.

In step S221, the storage reference unit 125 passes the encrypted model configuration information to the falsification detection unit 123.

The falsification detection unit 123 generates an authentication tag of the encrypted model configuration information.

The authentication tag that is generated will be referred to as a "provisional authentication tag".

In step S222, the operation execution unit 121 uses the memory management unit 102 to acquire input data from the application 111. The memory management unit 102 reads the input data from the memory region for the application 111 in the rich memory 103 into the memory region for the operation execution unit 121 in the rich memory 103.

The target operation includes operations for operation functions whose execution order is determined.

Step S231 to step S234 are executed for each of the operation functions according to the execution order of the operation functions. That is, step S231 to step S234 are repeated the same number of times as the number of operation functions.

The operation function to be handled will be referred to as a "target function".

In step S231, the storage reference unit 125 acquires the encrypted parameter of the target function from the learning model information 191, and passes the encrypted parameter of the target function to the decryption processing unit 122.

The decryption processing unit 122 decrypts a parameter from the encrypted parameter of the target function, using the cryptographic key 193 stored in the secure memory 105.

In step S232, the operation execution unit 121 acquires the parameter from the decryption processing unit 122, and sets the parameter in the target function.

In step S233, the storage reference unit 125 passes the encrypted parameter of the target function to the falsification detection unit 123.

The falsification detection unit 123 executes the calculation process using the encrypted parameter of the target function so as to update the provisional authentication tag.

In step S234, the operation execution unit 121 calculates the target function.

For example, when the target function is the first operation function, the operation execution unit 121 executes the target function on the input data. When the target function is the second or later operation function, the operation execution unit 121 executes the target function on the operation result of the previous target function.

In step S235, the operation execution unit 121 determines whether the operations of all the operation functions have been completed.

If the operations of all the operation functions have not been completed, processing proceeds to step S231.

If the operations of all the operation functions have been completed, processing proceeds to step S241.

In step S241, the falsification detection unit 123 generates a verification authentication tag, using the provisional authentication tag.

In step S242, the storage reference unit 125 uses the memory management unit 102 to acquire the reference authentication tag 192. The memory management unit 102 reads the reference authentication tag 192 from the storage 104 into the memory region of the storage reference unit 125 in the rich memory 103.

The storage reference unit 125 passes the reference authentication tag 192 to the falsification detection unit 123.

The falsification detection unit 123 acquires the reference authentication tag 192 from the storage reference unit 125.

In step S243, the falsification detection unit 123 checks the verification authentication tag against the reference authentication tag 192.

Then, based on the result of checking, the falsification detection unit 123 determines whether the encrypted model information is falsified information.

If the verification authentication tag matches the reference authentication tag 192, the falsification detection unit 123 determines that the encrypted model information is not falsified information. Then, processing proceeds to step S251.

If the verification authentication tag does not match the reference authentication tag 192, the falsification detection unit 123 determines that the encrypted model information is falsified information. Then, processing proceeds to step S261.

In step S251, the operation execution unit 121 passes an operation result to the output control unit 124.

Step S251 is the same as step S133 in Embodiment 1. However, the execution result of the final operation function is passed to the output control unit 124.

In step S261, the output control unit 124 uses the memory management unit 102 to pass a falsification notification to the application 111.

Step S261 is the same as step S141 in Embodiment 1.

In step S271, the output control unit 124 transmits a completion response to the switching unit 131.

Step S271 is the same as step S151 in Embodiment 1.

Supplement to Embodiment 2

As an algorithm for encrypting model information and detecting falsification of the model information, authenticated cryptography using Galois/Counter Mode (GCM) can be utilized.

Figure 7:
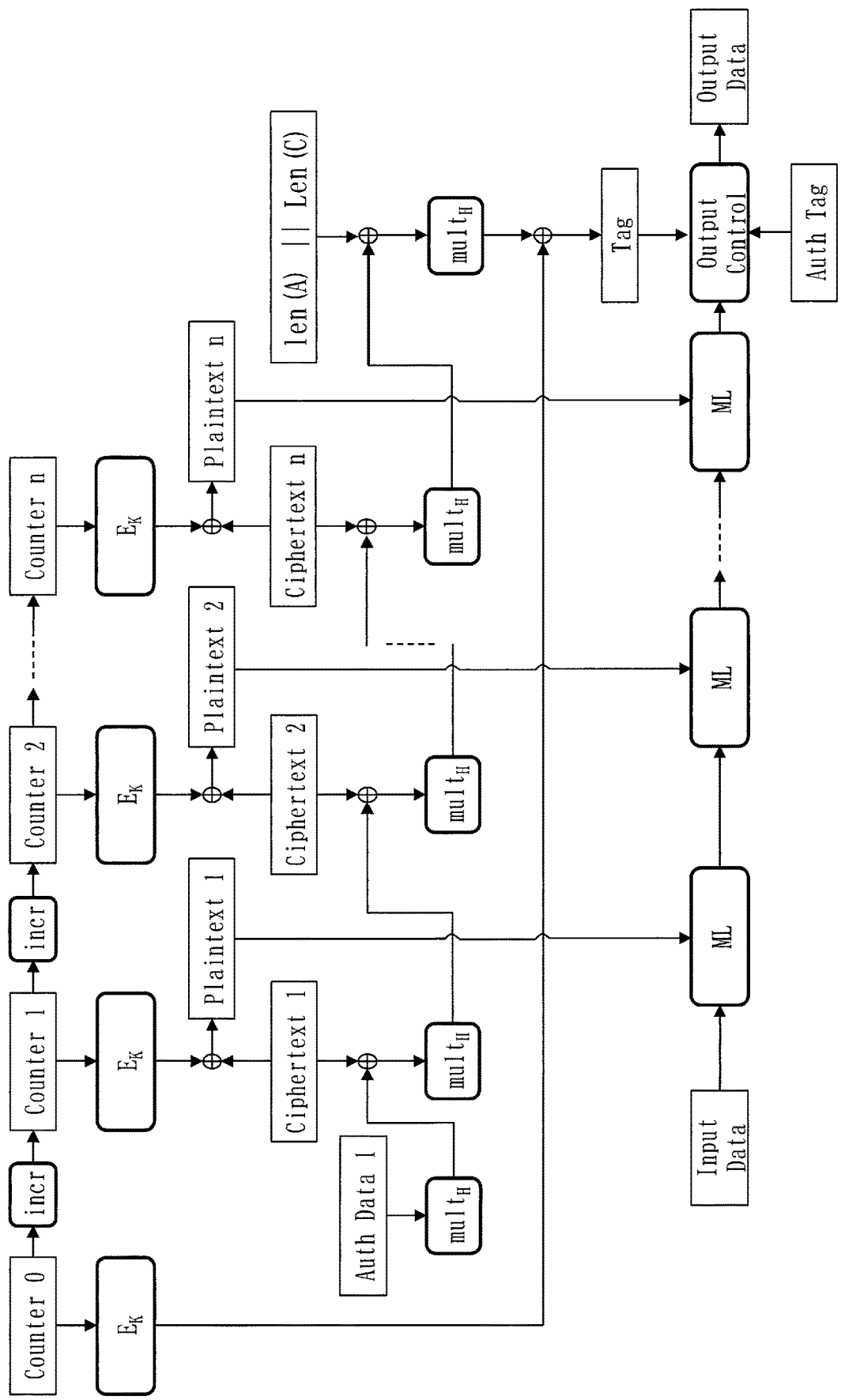
FIG. 7 is a diagram illustrating an example of application of GCM in Embodiment 2.

Based on FIG. 7, an example of applying an authenticated cryptographic process using GCM to Embodiment 2 will be described.

A machine learning algorithm is composed of operation functions that have been machine-learned (MLs), and returns an operation result (Output Data) for input data (Input Data).

A parameter (Plaintext) used in a machine learning operation is encrypted.

When an operation function is executed, an encrypted parameter (Ciphertext) is decrypted, and the parameter is used in the operation function. In addition, a provisional authentication tag (Auth Data) is updated sequentially.

The parameter deployed sequentially and the intermediate result obtained by each operation function are deleted or overwritten each time an operation functions is executed. This reduces the amount of data deployed in the rich memory 103.

When all the operation functions have been executed, a verification authentication tag (Tag) is generated, and the reference authentication tag 192 (Auth Tag) stored in the storage 104 and the verification tag are compared to check the presence or absence of falsification.

If there is no falsification, an operation result (Output Data) is output.

If there is falsification, a falsification notification (Output Data) is output instead of the operation result.

The authenticated cryptographic process and machine learning operation process may be executed in parallel or may be processed concurrently.

Figure 8:
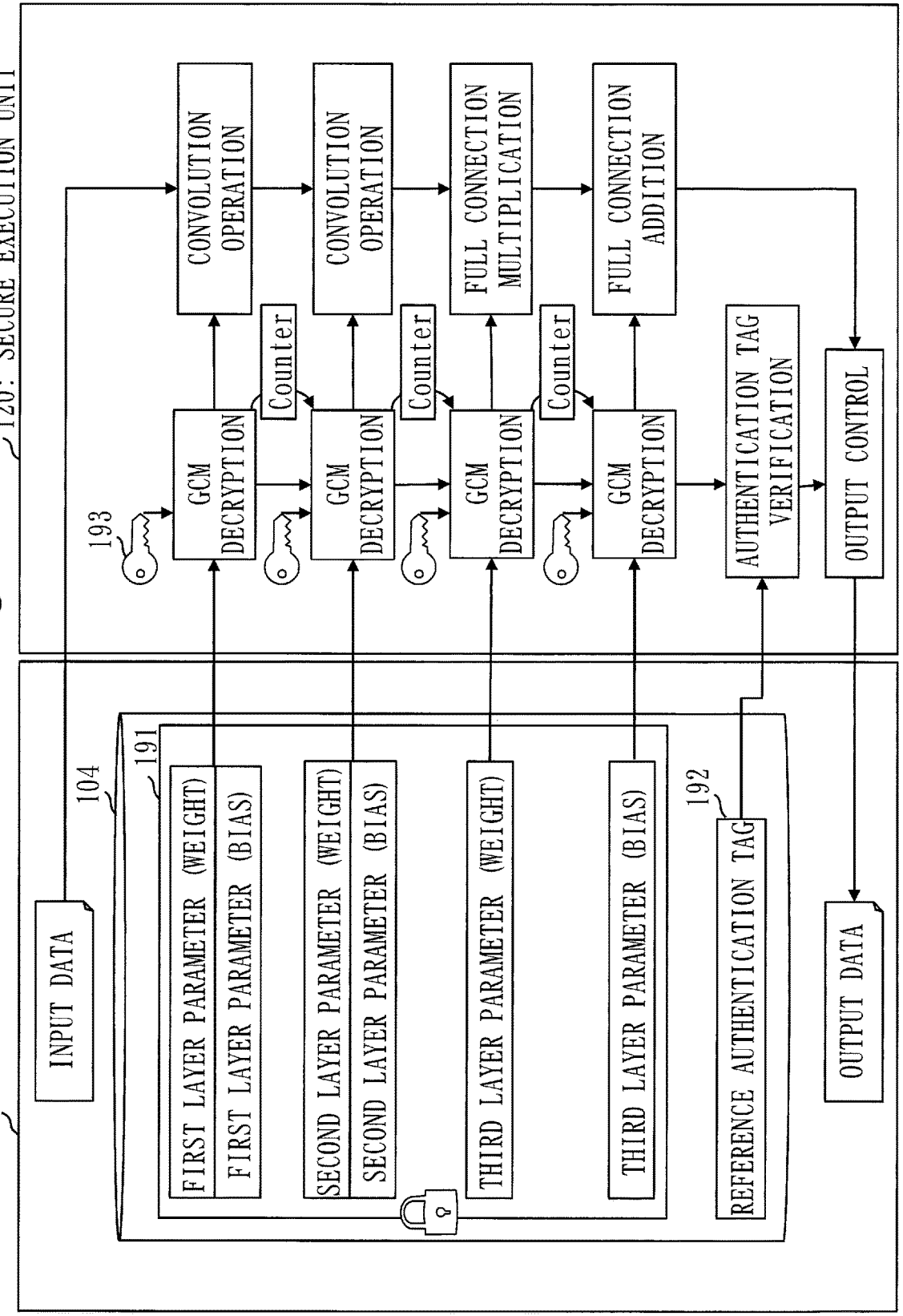
FIG. 8 is a diagram illustrating an example of application of GCM to a three-layered neural network in Embodiment 2.

Based on FIG. 8, an example of applying the authenticated cryptographic process using GCM to Embodiment 2 will be described with regard to a case where the learning model is a three-layered neural network.

The rich execution unit 110 manages input data, the learning model information 191, and the reference authentication tag 192.

The learning model information 191 includes encrypted model configuration information. Model configuration information is decrypted from the encrypted model configuration information by the secure execution unit 120. In the model configuration information, operation functions of the three-layered neural network are set.

The reference authentication tag 192 is generated in advance.

First, input data is passed from the rich execution unit 110 to the secure execution unit 120.

Next, the operation function (convolution operation) of the first layer is executed. At this time, parameters of the first layer are decrypted and deployed in a memory region for the secure execution unit 120. In addition, a provisional authentication tag is updated. After the operation function of the first layer is completed, the data (parameters, etc.) used in the operation is deleted from the memory region.

Next, the operation function (convolution operation) of the second layer is executed. At this time, parameters of the second layer are decrypted and deployed in the memory region for the secure execution unit 120. In addition, the provisional authentication tag is updated. After the operation function of the second layer is completed, the data (parameters, etc.) used in the operation is deleted from the memory region.

Next, the first operation function (full connection multiplication) of the third layer is executed. At this time, a parameter (weight) of the third layer is decrypted and deployed in the memory region for the secure execution unit 120. In addition, the provisional authentication tag is updated. After the first operation function of the third layer is completed, the data (parameter, etc.) used in the operation is deleted from the memory region.

Next, the second operation function (full connection addition) of the third layer is executed. At this time, a parameter (bias) of the third layer is decrypted and deployed in the memory region for the secure execution unit 120. In addition, the provisional authentication tag is updated. After the second operation function of the third layer is completed, the data (parameter, etc.) used in the operation is deleted from the memory region.

Then, a verification authentication tag is generated using the provisional authentication tag, and the verification authentication tag is compared with the reference authentication tag 192 to determine the presence or absence of falsification.

If there is no falsification, an operation result (output data) is passed from the secure execution unit 120 to the rich execution unit 110.

If there is falsification, a falsification notification (output data) is passed from the secure execution unit 120 to the rich execution unit 110.

When one layer has a plurality of operations, the plurality of operations may be executed separately, as in the third layer. Alternatively, the plurality of operations may be executed collectively instead of separately.

Two or more layers may be combined. That is, two or more operations of different layers may be executed collectively. Furthermore, input data may be divided into portions of a certain size to execute each operation.

Effects of Embodiment 2

The information processing device 100 processes machine learning operations in units of operation functions in parallel or concurrently. As a result, maintaining the confidentiality of model information and falsification detection for the model information can both be achieved in a secure execution environment while reducing the overhead of memory resources and calculation time.

In step S231 to step S234, instead of decrypting and deploying all the parameters, the parameters are decrypted and deployed on a per operation function basis. As a result, the amount of memory used during the operations can be reduced.

Supplement to Embodiments

Figure 9:
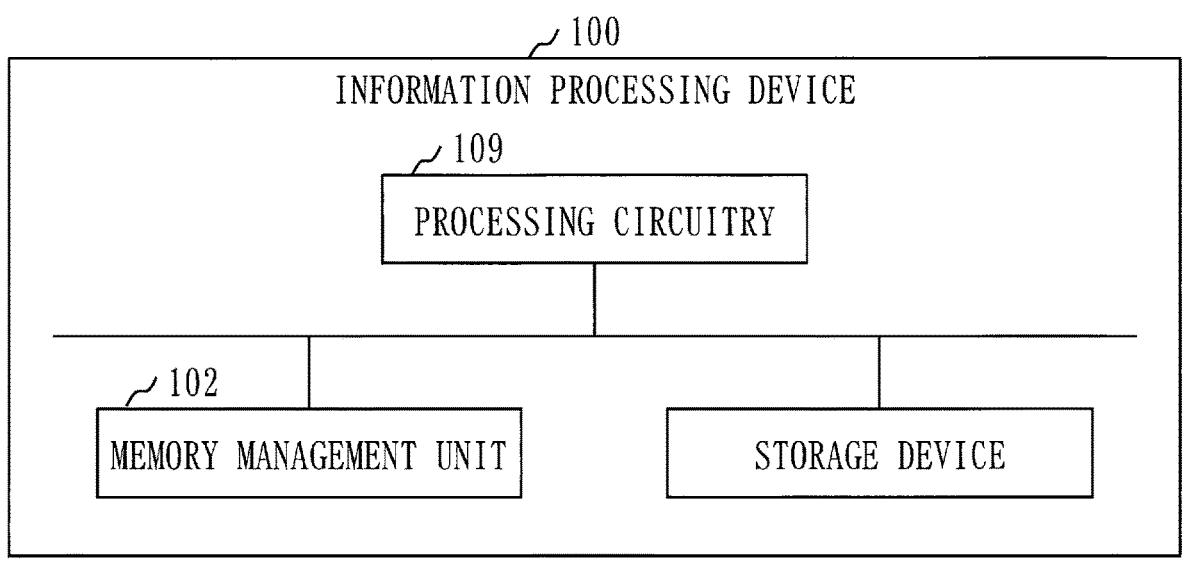
FIG. 9 is a hardware configuration diagram of the information processing device 100 in the embodiments.

Based on FIG. 9, a hardware configuration of the information processing device 100 will be described. A storage device represents the rich memory 103, the storage 104, and the secure memory 105.

The information processing device 100 includes processing circuitry 109.

The processing circuitry 109 is hardware that realizes the rich execution unit 110, the secure execution unit 120, and the monitor unit 130.

The processing circuitry 109 may be dedicated hardware, or may be the processor 101 that executes programs stored in the storage device.

When the processing circuitry 109 is dedicated hardware, the processing circuitry 109 is, for example, a single circuit, a composite circuit, a programmed processor, a parallel-programmed processor, an ASIC, an FPGA, or a combination of these.

ASIC is an abbreviation for application specific integrated circuit.

FPGA is an abbreviation for field programmable gate array.

The information processing device 100 may include a plurality of processing circuits as an alternative to the processing circuitry 109.

In the processing circuitry 109, some functions may be realized by dedicated hardware, and the remaining functions may be realized by software or firmware.

As described above, the functions of the information processing device 100 can be realized by hardware, software, firmware, or a combination of these.

Each of the embodiments is an example of a preferred embodiment and is not intended to limit the technical scope of the present disclosure. Each of the embodiments may be implemented partially, or may be implemented in combination with another embodiment. The procedures described using the flowcharts or the like may be suitably modified.

Each "unit" that is an element of the information processing device 100 may be interpreted as "process", "step", "circuit", or "circuitry".

REFERENCE SIGNS LIST

100: information processing device, 101: processor, 102: memory management unit, 103: rich memory, 104: storage, 105: secure memory, 109: processing circuitry, 110: rich execution unit, 111: application, 120: secure execution unit, 121: operation execution unit 122: decryption processing unit, 123: falsification detection unit, 124: output control unit, 125: storage reference unit, 130: monitor unit, 131: switching unit, 191: learning model information, 192: reference authentication tag, 193: cryptographic key.

The invention claimed is:

1. An information processing device comprising processing circuitry to perform:
a rich execution process of executing an application while executing a rich operating system; and
a secure execution process of executing a target operation while executing a secure operating system, the target operation being an operation based on a learning model,
the secure execution process including
a decryption process of decrypting model information from encrypted model information of the learning model when execution of the target operation is requested by the application;
an operation execution process of executing the target operation using the model information;
a falsification detection process of determining whether the encrypted model information is falsified information; and
an output control process of passing an execution result of the target operation to the application when it is determined that the encrypted model information is not the falsified information,
wherein the target operation includes operations for operation functions whose execution order is predetermined,
wherein the encrypted model information includes encrypted parameters respectively corresponding to the operation functions and encrypted model configuration information,
wherein the decryption process decrypts a parameter of each of the operation functions from an encrypted parameter of each of the operation functions,
wherein the operation execution process calculates, according to the execution order, each of the operation functions using the parameter of each of the operation functions,
wherein the falsification detection process executes, according to the execution order, a calculation process using the encrypted parameter of each of the operation functions in parallel with an operation of each of the operation functions or concurrently with the operation of each of the operations functions so as to determine whether the encrypted model information is the falsified information, and
wherein the calculation process is a process to generate an authentication tag of the encrypted model configuration information as a provisional authentication tag, update the generated provisional authentication tag, according to the execution order, using the encrypted parameter of each of the operation functions, generate a verification authentication tag using the updated provisional authentication tag, and check the verification authentication tag against a reference authentication tag to determine whether the encrypted model information is the falsified information.

2. The information processing device according to claim 1,
wherein the processing circuitry passes a falsification notification to the application when it is determined that the encrypted model information is the falsified information.

3. An information processing method to perform:
a rich execution process of executing an application while executing a rich operating system; and
a secure execution process of executing a target operation while executing a secure operating system, the target operation being an operation based on a learning model,
the secure execution process including
a decryption process of decrypting model information from encrypted model information of the learning model when execution of the target operation is requested by the application;
an operation execution process of executing the target operation using the model information;
a falsification detection process of determining whether the encrypted model information is falsified information; and
an output control process of passing an execution result of the target operation to the application when it is determined that the encrypted model information is not the falsified information,
wherein the target operation includes operations for operation functions whose execution order is predetermined,
wherein the encrypted model information includes encrypted parameters respectively corresponding to the operation functions and encrypted model configuration information,
wherein the decryption process decrypts a parameter of each of the operation functions from an encrypted parameter of each of the operation functions,
wherein the operation execution process calculates, according to the execution order, each of the operation functions using the parameter of each of the operation functions,
wherein the falsification detection process executes, according to the execution order, a calculation process using the encrypted parameter of each of the operation functions in parallel with an operation of each of the operation functions or concurrently with the operation of each of the operations functions so as to determine whether the encrypted model information is the falsified information, and
wherein the calculation process is a process to generate an authentication tag of the encrypted model configuration information as a provisional authentication tag, update the generated provisional authentication tag, according to the execution order, using the encrypted parameter of each of the operation functions, generate a verification authentication tag using the updated provisional authentication tag, and check the verification authentication tag against a reference authentication tag to determine whether the encrypted model information is the falsified information.

4. The information processing method according to claim 3,
wherein the output control process passes a falsification notification to the application when it is determined that the encrypted model information is the falsified information.

5. A non-transitory computer readable medium storing an information processing program to cause a computer to execute:
a rich execution process of executing an application while executing a rich operating system; and
a secure execution process of executing a target operation while executing a secure operating system, the target operation being an operation based on a learning model,
the secure execution process including
a decryption process of decrypting model information from encrypted model information of the learning model when execution of the target operation is requested by the application;
an operation execution process of executing the target operation using the model information;
a falsification detection process of determining whether the encrypted model information is falsified information; and
an output control process of passing an execution result of the target operation to the application when it is determined that the encrypted model information is not the falsified information,
wherein the target operation includes operations for operation functions whose execution order is predetermined,
wherein the encrypted model information includes encrypted parameters respectively corresponding to the operation functions and encrypted model configuration information,
wherein the decryption process decrypts a parameter of each of the operation functions from an encrypted parameter of each of the operation functions,
wherein the operation execution process calculates, according to the execution order, each of the operation functions using the parameter of each of the operation functions,
wherein the falsification detection process executes, according to the execution order, a calculation process using the encrypted parameter of each of the operation functions in parallel with an operation of each of the operation functions or concurrently with the operation of each of the operations functions so as to determine whether the encrypted model information is the falsified information, and
wherein the calculation process is a process to generate an authentication tag of the encrypted model configuration information as a provisional authentication tag, update the generated provisional authentication tag, according to the execution order, using the encrypted parameter of each of the operation functions, generate a verification authentication tag using the updated provisional authentication tag, and check the verification authentication tag against a reference authentication tag to determine whether the encrypted model information is the falsified information.

6. The non-transitory computer readable medium storing the information processing program according to claim 5,
wherein the output control process passes a falsification notification to the application when it is determined that the encrypted model information is the falsified information.

* * * * *